United States Patent Office 3,289,838
Patented Dec. 6, 1966

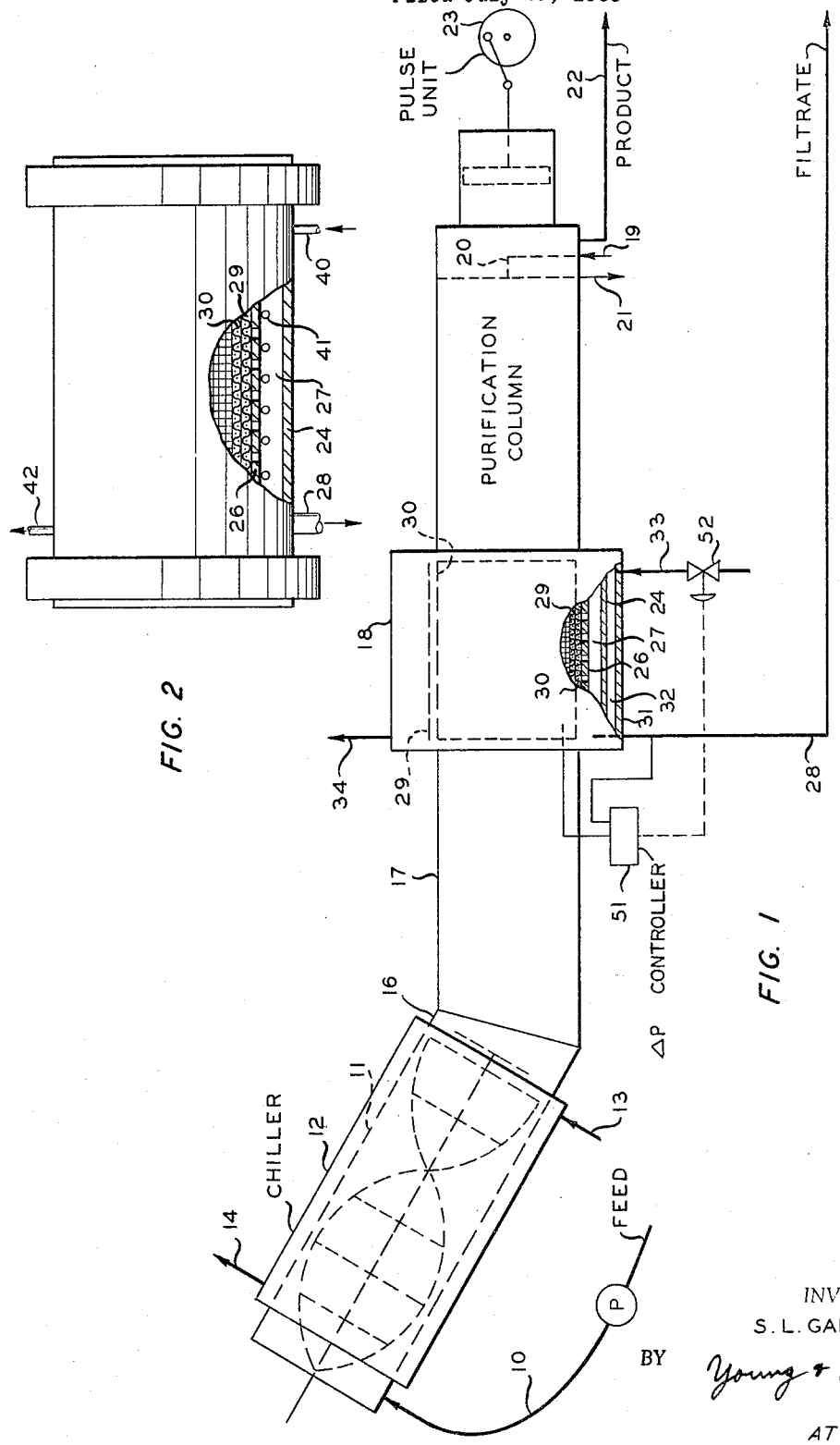

3,289,838
CRYSTAL PURIFICATION APPARATUS
Samuel L. Garrett, Bartlesville, Okla., assignor to Phillips Petroleum Company, a corporation of Delaware
Filed July 29, 1963, Ser. No. 298,279
1 Claim. (Cl. 210—97)

This invention relates to means for the separation and purification of components of a liquid multi-component mixture. In another aspect, it relates to means for the separation and purification of components of a liquid multi-component mixture by crystallization. In still another aspect, it relates to an apparatus for separating formed crystals and mother liquor produced from liquid multi-component mixtures.

The separation of chemical compounds by means of crystallization finds many applications in industrial installations. While separation by distillation or solvent extraction seems to be generally preferred, there are cases when these methods are impractical or impossible and the desired separation can be effected only by means of crystallization. Thus, when confronted with chemical isomers having similar boiling points and solubilities or with aqeuous solutions having relatively minor proportions of desirable materials, or with materials having relatively high boiling ranges or with thermally unstable substances or with solutions containing both volatile and non-volatile impurities or undesired constituents, separation by crystallization may be the only method which can be advantageously employed. In one method of crystal separation, a liquid multi-component mixture is cooled so as to form crystals of at least a higher melting component and the crystals and adhering mother liquor are passed into a purification column wherein the mother liquor is filtered from the crystals. The separated crystals are passed in a compact contiguous mass through a reflux zone of said purification column wherein the crystals are refluxed with material supplied either from outside the column or by melting a portion of the crystals in a melting section near the outlet of the purification column. When the latter refluxing method is employed, a portion of the melted crystals are withdrawn as product while the remainder of the melt is forced countercurrently to the movement of the crystals and in contact therewith so as to remove occluded impurities therefrom.

The mother liquor is separated from the crystals by filtration, employing such means as filtering screens. A problem associated with this type of separation is the difficulty of preventing the filter from becoming clogged with crystals, reducing the flow of mother liquor through the filter. Clogging of the filter also prevents the crystals from being refluxed properly by obstructing the flow of liquid impurities from the reflux zone, said impurities separated from the crystals by the refluxing liquid in the reflux zone, lowering crystal product purity and reducing throughput.

Accordingly, an object of my invention is to provide an improved apparatus for the separation of multi-component mixtures.

Another object of my invention is to provide an apparatus for the separation and purification of multi-component mixtures by crystallization.

Another object of my invention is to provide means to prevent clogging of the filters in the separation zone of an apparatus for the purification of multi-component mixtures by crystallization.

These and other objects of my invention will become readily apparent to those skilled in the art from the following description, drawings and appended claims.

Broadly, I have discovered an improved crystallization apparatus wherein by heating the liquid-crystal separation zone of the purification column, improved crystal product purity and increased throughout are effected.

The apparatus of this invention is applicable to a vast number of simple binary and complex multi-component mixtures. The invention is particularly applicable to the separation of hydrocarbons which have practically the same boiling points, and are, therefore, difficult to separate by distillation. If high boiling organic compounds are concerned, separation by distillation is often undesirable because many such compounds are unstable at high temperatures. The apparatus of this invention is applicable to the separation of systems containing xylenes, systems containing cyclohexanes, systems containing normal paraffins, and systems containing benzene and the like.

It is not intended, however, to limit the use of apparatus of the invention to organic mixtures, but rather it can be used to separate inorganic mixtures as well, and offers a practical means for separating two inorganic compounds between which solvates or hydrates are formed. Aqueous solutions can be concentrated by the invention involving chilling the aqueous solution to form ice crystals with subsequent separation of the ice crystals from the mother liquor. This apparatus can be used to concentrate food products without damaging their taste. In this respect, concentration by crystallization represents a considerable improvement over evaporative processes which rely upon heat and/or extremely low pressures. The removal of water by evaporation also results in the removal of much of the essential oils and esters, many of which are not recoverable, so that the concentrated product can never be restored to its original freshness and flavor. Concentration by crystallization can be employed to advantage in the processing of such food products and beverages as milk, fruit juices, vegetable juices, vinegar, beer, wine, liquors and the like.

In the drawings:

FIGURE 1 is illustrative of one embodiment of the invention.

FIGURE 2 is illustrative of a second embodiment of the invention.

Referring now to FIGURE 1, a feed mixture comprising two or more components, one of which is separable from the mixture by crystallization, is passed through conduit means 10 into chiller 11. Chiller 11 can comprise a conventional means, such as a scraped surface chiller, for chilling the feed mixture so as to form a slurry comprised of crystals and mother liquor. As illustrated, chiller 11 is surrounded by cooling jacket 12 having a coolant inlet conduit 13 and a coolant outlet conduit 14. Within chiller 11, crystals are formed so as to form a crystal slurry which contains normally from about 20 to about 60 weight percent solids. While it is desirable to concentrate as much as possible the formation of crystal solids, if the solids content is too high the slurry becomes quite stiff and becomes too difficult to pass from the chiller.

The slurry of crystals comprising crystals and adhering mother liquor is passed from chiller 11 via conduit means 16 to crystal purification column 17. Crystal purification column 17 can be a piston-type column substantially as described in the patent to Schmidt, Re. 23,810, or a pulse-type column as herein illustrated and described in the patent to R. W. Thomas, 2,854,494, with specific modifications as hereinafter described. In either type of column, a compacted mass of crystals is forced through the column; a filter section 18 is provided in an intermediate portion in purification column 17 so that mother liquor can be withdrawn from the column and separated from the crystals; and the compacted mass of crystals is refluxed with a liquid passed countercurrently through the mass of crystals. Whereas the purification column of Schmidt and the purification column of Thomas provide a means of heating the crystal mass in the downstream region of the column, thereby providing a reflux liquid and providing for the withdrawal of the crystals from the purification column as a liquid melt, it is also within the scope of this invention to provide a method and apparatus for withdrawing the formed crystals from purification column 17 without transforming the solid crystals to liquid melt. A reflux liquid from a source external to the purification column is passed through the purification column countercurrent to the movement of the crystal mass.

Downstream of the filter section 18, the mass of crystals is refluxed with the liquid passed countercurrently through the mass of crystals as heretofore described. The mass of crystals moves through the reflux zone into the melt zone wherein said crystals are melted by means of a heating medium passed via conduit inlet means 19 to heat exchange means 20 and withdrawn from heat exchange means 20 via conduit outlet means 21. A portion of the melted crystals is passed countercurrent to the moving mass of crystals in the heretofore described manner, and the remainder of the melted crystals is withdrawn from the melt zone via conduit means 22. As illustrated, purification column 17 is a pulse-type column having a pulse unit 23.

Liquid is separated from the crystals in filtration zone 18. As illustrated in FIGURE 1, filtration zone 18 is comprised of a filter housing 24, a perforated back-up member 26 forming an annular space 27 within said housing, said housing having an outlet conduit 28, a back-up coarse screen 29, and a fine screen 30. Surrounding filter housing 24 is a jacket 31 forming an annular space 32 between said housing and said jacket, said jacket having an inlet conduit means 33 and an outlet conduit means 34. The perforated back-up plate is preferably designed so as to produce a maximum of open space for the removal of mother liquor to the annulus 27. A suitable back-up plate is composed of $5/16$-inch by 1-inch oblong on staggered $1/2$-inch centers with 52 percent open spaces in a $1/8$-inch thick type 304 stainless steel perforated member. Directly adjacent to the interior of the back-up plate and in contact therewith is a back-up coarse filter screen 29. Directly adjacent the interior of said back-up coarse screen is a fine screen 30 which is the actual filtering medium. This fine screen is in direct contact with the moving crystals. A suitable coarse screen is a 10 x 10 type 304 stainless steel screen and a suitable fine screen is a 20 x 350 type 304 stainless steel screen inside the coarse screen.

It has been discovered that the separation of liquid from the crystals is substantially improved by applying heat to the filtering zone containing the filter screen so as to prevent the crystals from clogging the filter screen. Heat is applied to the filtering zone so as to provide a temperature within the said filtering zone above or near the freezing point of the crystals. As illustrated in FIGURE 1, heat is applied to the filtering zone by passing a heating medium via conduit means 33 to the annular space 32. The heating medium is withdrawn from annular space 32 via conduit means 34. Although as illustrated the filter housing, back-up plate and screens are cylindrical, it is believed obvious that other shapes, such as ovals, which provide a smooth flow path with a minimum of obstruction to the mass of moving crystals, are suitable.

By heating the filtering zone in the described manner, improved refluxing of the crystals in the reflux zone is obtained. Liquid withdrawn from the reflux zone comprising impurities removed from the crystals in the reflux zone is withdrawn from the purification column through filter screen 30. By preventing the clogging of filter screen 30, the withdrawal of liquid from the reflux zone is uninterrupted, increasing the product purity of the crystals withdrawn from the purification column via conduit means 22.

A second embodiment of the invention is illustrated in FIGURE 2. A helical-shaped heating coil 41 is positioned about and adjacent to back-up plate 26. A heating medium is passed to the coil via conduit means 40 and withdrawn from the coil via conduit means 42. Other means of heating the filtering zone can also be employed such as fabricating screen 30 or screen 29 of insulated electrically resident wiring. In this manner, heat can be applied directly to the filter screen.

Heat input to the filtering zone can be controlled by, for example, measuring the pressure differential ($\Delta^p$) across the filtering screen 30 by a conventional $\Delta^p$ controller 51 and manipulating the flow of heating medium through valve 52 responsive to the $\Delta^p$ measurement and a set point representative of the desired $\Delta^p$ across the filter. It is also within the scope of this invention to measure the temperature behind the filter and manipulate the flow of heat to the filtering zone responsive to the measured temperature.

The following examples are presented to illustrate the effectiveness of the invention. It is not intended that the invention should be limited to the specific embodiments disclosed therein.

*Example I*

In order to demonstrate the effectiveness of the conventional crystal purification process, an aqueous slurry having a concentration of alcohol of 7.9 weight percent and comprising 37 weight percent solids, and at a temperature of 16° F., was passed to a 6-inch diameter pulse-type purification column. The pulse unit had a displacement volume of 3 cubic inches and operated at the rate of 300 cycles per minute. The purification column had a feed zone length of 78 inches, a filter zone length of 12 inches, and a reflux zone length of 24 inches. The filter screen was of 20 x 250 mesh Dutch twill and had a total surface area of 200 square inches. The temperature of the mother liquor in the filtration zone adjacent the filter screen was 17° F.

Melted ice crystals were withdrawn from the melt zone at 52° F. and at the rate of 19 gallons per hour and a liquid was withdrawn from the filtration zone at the rate of 25 gallons per hour. The concentration of alcohol in the melted ice crystals withdrawn from the purification column ranged from 0.74 to 1.72 weight percent.

*Example II*

The slurry feed of Example I was passed to the purification column of Example I at the same feed rate and under the same conditions as in Example I. The temperature of the mother liquor in the filtration zone adjacent the filter screen was maintained at 23.5° F. by heating the filtration zone. Melted ice crystals at a temperature of 52° F. and at the rate of 19 gallons per hour were withdrawn from the melting zone. Liquid at the rate of 30 gallons per hour was withdrawn from the filtration zone.

The concentration of alcohol in the melted crystals withdrawn from the melting zone ranged from 0.04 to 0.025 weight percent. By comparison of the results of Example I and Example II it is clear that a substantial improvement in product purity of ice crystals was obtained by heating the purification zone.

Various modifications of this invention can be made, or followed, in view of the foregoing disclosure without departing from the spirit or the scope thereof.

I claim:

In a separation system that includes a chiller to freeze a portion of a fluid mixture to be separated, an elongated purification column, conduit means communicating between said chiller and the first end of said column to pass a slurry of crystals and mother liquor from said chiller into said column, first outlet conduit means communicating with an intermediate region of said column to remove mother liquor, a filter positioned between the interior region of said column and said first outlet conduit means to permit flow of mother liquor into said first outlet conduit means while blocking the flow of crystals, means to melt crystals in the second end of said column, and second outlet conduit means communicating with the second end of said column to remove crystal melt from said column; improved apparatus for preventing clogging of said filter by said crystals, which apparatus comprises a heating element surrounding said filter to impart heat directly to said filter, means to sense the pressure drop across said filter, and means responsive to said means to sense to control said heating element to regulate the amount of heat imparted to said filter, the heat imparted to said filter serving to melt crystals and thereby preventing clogging of said filter.

References Cited by the Examiner

UNITED STATES PATENTS

| 2,835,598 | 5/1958 | Kolner | 23—273 |
| 2,894,997 | 7/1959 | Hachmuth | 23—273 |
| 2,910,516 | 10/1959 | Rush | 23—273 |

REUBEN FRIEDMAN, *Primary Examiner.*

SAMIH N. ZAHARNA, *Examiner.*